United States Patent
Lee et al.

(10) Patent No.: US 7,398,410 B2
(45) Date of Patent: Jul. 8, 2008

(54) PROCESSOR EMPLOYING A POWER MANAGING MECHANISM AND METHOD OF SAVING POWER FOR THE SAME

(75) Inventors: Jenq-Kuen Lee, Tainan (TW); Yung-Chia Lin, Taipei (TW); Yi-Ping Yu, Wu Rih Township, Taichung County (TW); Chung-Wen Huang, Liu Chiao Township, Chia Yi County (TW)

(73) Assignee: National Tsing Hua University, Hsinchu (TW)

( * ) Notice: Subject to any disclaimer, the term of this patent is extended or adjusted under 35 U.S.C. 154(b) by 462 days.

(21) Appl. No.: 11/177,369

(22) Filed: Jul. 8, 2005

(65) Prior Publication Data
US 2007/0011474 A1    Jan. 11, 2007

(51) Int. Cl.
*G06F 1/32* (2006.01)

(52) U.S. Cl. .................. 713/324; 713/300; 713/310; 713/320; 713/321; 713/322; 713/323; 713/330; 713/340; 712/43

(58) Field of Classification Search ............... 713/300, 713/310, 320–324, 330, 340; 712/43
See application file for complete search history.

(56) References Cited

U.S. PATENT DOCUMENTS

| | | | | |
|---|---|---|---|---|
| 6,202,163 B1* | 3/2001 | Gabzdyl et al. | ............. | 713/324 |
| 6,219,796 B1* | 4/2001 | Bartley | ........................ | 713/320 |
| 6,795,781 B2* | 9/2004 | Aldridge et al. | ............... | 702/60 |
| 6,924,999 B2* | 8/2005 | Masui | ........................ | 365/145 |
| 7,058,458 B2* | 6/2006 | Munezane | ................... | 700/12 |
| 7,107,471 B2* | 9/2006 | Feierbach | ................... | 713/324 |
| 2005/0283629 A1* | 12/2005 | Tanaka et al. | ............... | 713/322 |
| 2007/0106914 A1* | 5/2007 | Muthukumar et al. | ....... | 713/300 |

* cited by examiner

*Primary Examiner*—Abdelmoniem Elamin
(74) *Attorney, Agent, or Firm*—Egbert Law Offices

(57) ABSTRACT

A processor includes a plurality of execution units configured to execute instructions, a pre-decoder configured to sieve out a power-switching instruction from the instructions, and a power controller configured to control the status of the execution unit based on the power-switching instruction. The power controller includes an identification decoder configured to generate identifications respectively corresponding to the execution units from the power-switching instruction, and a power manager configured to switch the execution unit corresponding to the identification. Particularly, the power-switching instruction includes a power-on instruction and a power-off instruction. The processor further includes a plurality of reservation tables each configured to store the instruction to be executed by one of the execution units, and a turn-off signal is not conveyed to the power manager until the reservation table corresponding to the execution unit to be turned off is empty.

11 Claims, 3 Drawing Sheets

PROCESSOR EMPLOYING A POWER MANAGING MECHANISM AND METHOD OF SAVING POWER FOR THE SAME

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a processor employing a power managing mechanism and method of saving power for the same, and more particularly, to a processor employing a power managing mechanism by incorporating a power-on instruction and a power-off instruction and method of saving power for the same.

BACKGROUND OF THE INVENTION

The demands of power-constrained mobile and embedded computing applications increase rapidly. Reducing power consumption hence becomes a crucial challenge for today's software and hardware developers. While maximization of battery life is an obvious goal, the reduction of heat dissipation is important as well. The reduction of power consumption is an objective similar to the reduction of heat dissipation. Minimization of power dissipation can be considered at algorithmic, architectural, logic and circuit levels. Studies on low power design are abundant in the literature in which various techniques have been proposed to synthesize designs with low transitional activities. Recently, new research directions in reducing power consumption have begun to address the issues on the aspect of architecture designs and on software arrangements at instruction-level to help reduce power consumption. The architecture and software efforts to reduce energy consumption in recent attempts have been primarily on the dynamic component of power dissipation (also known as dynamic power).

Various techniques have been proposed to reduce the power consumption of processors. These techniques include increasing the integration of circuitry and incorporation of improved circuitry and power management units (PMUs). One specific power reduction technique employed in processors generally involves the capability of stopping clock signals that drive inactive circuit portions. A system employing such a technique typically includes a power management unit that detects or predicts inactive circuit portions and accordingly stops the clock signals associated with the inactive circuit portions. By turning off "unused" clock signals that drive inactive circuit portions, overall power consumption of the system is decreased. A similar technique involves the capability of reducing the frequency of clock signals that drive circuit portions during operating modes, which are not time critical, and another technique involves the capability of removing power from inactive circuit portions.

BRIEF SUMMARY OF THE INVENTION

The objective of the present invention is to provide a processor employing a power managing mechanism by incorporating a power-on instruction and a power-off instruction and method of saving power for the same.

In order to achieve the above-mentioned objective and avoid the problems of the prior art, the present invention provides a processor employing a power managing mechanism and method of saving power for the same. The processor comprises a plurality of execution units configured to execute instructions, a pre-decoder configured to sieve out a power-switching instruction from the instructions, and a power controller configured to control the on/off status of the execution unit based on the power-switching instruction. The power controller includes an identification decoder configured to generate an identification corresponding to one of the execution units from the power-switching instruction, and a power manager configured to switch on/off status of the execution unit corresponding to the identification. Moreover, in case the other identifications corresponding to other execution units can also be generated.

Particularly, the power-switching instruction includes a power-on instruction and a power-off instruction, and the identification decoder includes a power-on decoder configured to generate the identification and a turn-on signal from the power-on instruction and a power-off decoder configured to generate the identification and a turn-off signal from the power-off instruction. The processor further comprises a plurality of reservation tables each configured to store the instruction to be executed by one of the execution units, and the power-off decoder conveys the turn-off signal to the power manager after the reservation table corresponding to the execution unit to be turned off is empty.

The present method for saving power comprises steps of (1) receiving an instruction; (2) checking if the instruction is a power-switching instruction, (3) checking if the power-switching instruction is a power-off instruction; (4) generating at least one identification and a control signal, in which each identification corresponds to an execution unit; and (5) switching the execution unit according to the control signal. The method may further comprise a step of checking if a reservation table for the execution unit corresponding to the identification is empty on condition that the power-switching instruction is a power-off instruction. The control signal includes a turn-off signal and a turn-on signal, and the turn-off signal is not executed until the reservation table for the execution unit corresponding to the identification is empty, i.e., the turn-off signal is executed whenever the reservation table for the execution unit corresponding to the identification becomes empty.

BRIEF DESCRIPTION OF THE SEVERAL VIEWS OF THE DRAWINGS

The objectives and advantages of the present invention will become apparent upon reading the following description and upon reference to the accompanying drawings.

DETAILED DESCRIPTION OF THE INVENTION

Figure 1:
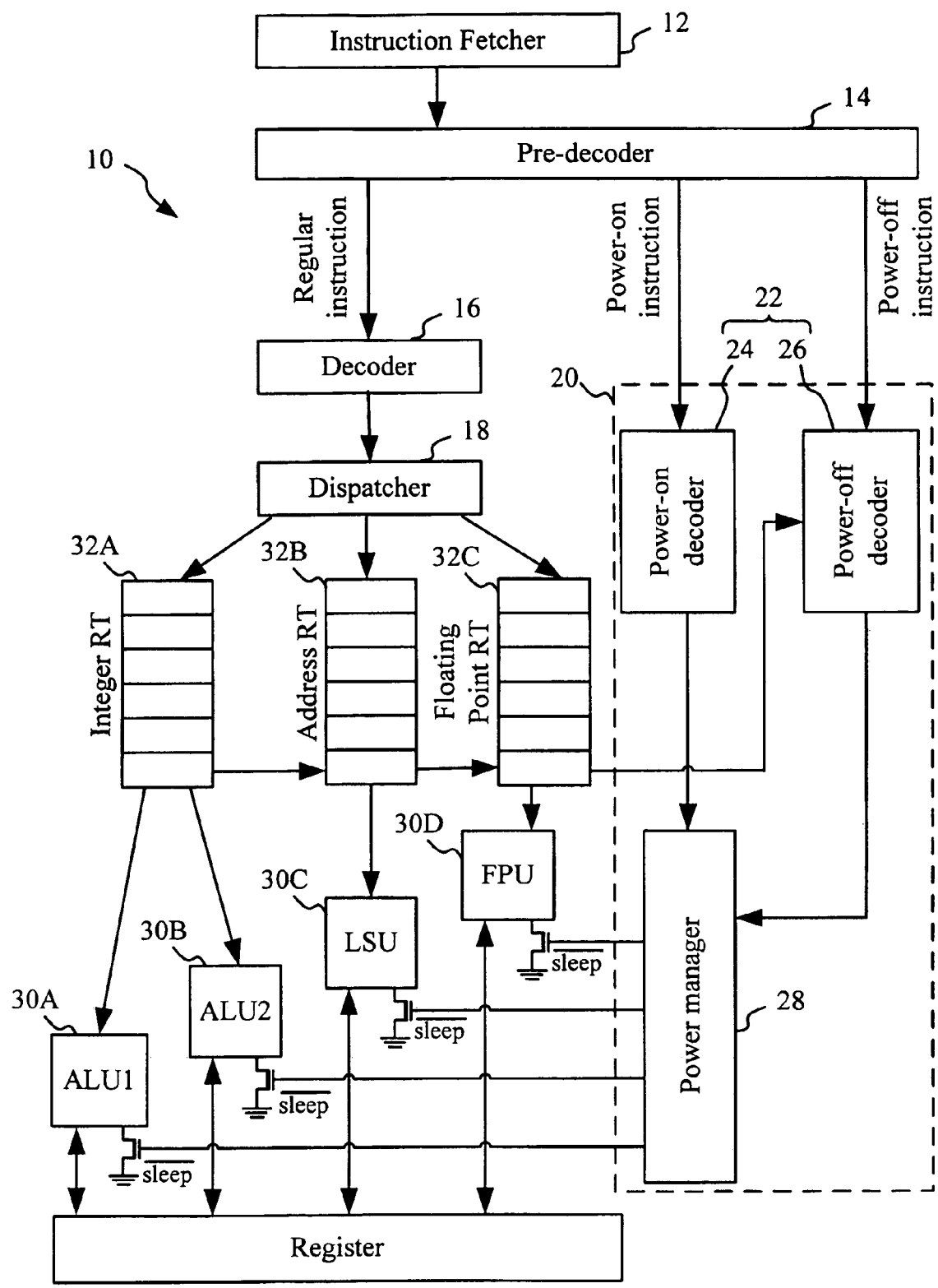
FIG. 1 illustrates a functional block diagram of a processor employing a power managing mechanism according to one embodiment of the present invention.

FIG. 1 illustrates a functional block diagram of a processor 10 employing a power managing mechanism according to one embodiment of the present invention. The processor 10 comprises a plurality of execution units 30A-30D each configured to execute instructions, a fetcher 12 configured to receive the instruction from a main memory system (not shown), a pre-decoder 16 configured to sieve out a power-switching instruction from the instructions, and a power controller 20 configured to control the power supply status, i.e., on/off, of the execution units 30A-30D based on the power-switching instruction. The power controller 20 includes an identification decoder 22 configured to generate a switching signal and at least one identification corresponding to one of the execution units 30A-30D based on the power-switching instruction, and a power manager 28 configured to switch on/off status of the one of the execution units 30A-30D corresponding to the identification according to the switching signal from the identification decoder 22.

Particularly, the power-switching instruction includes a power-on instruction and a power-off instruction, and the identification decoder 22 includes a power-on decoder 24 configured to be able to generate the identification and a turn-on signal based on the power-on instruction and a power-off decoder 26 configured to be able to generate the identification and a turn-off signal based on the power-off instruction. In other words, the identification is generated by either the power-on decoder 24 or the power-off decoder 26. The processor 10 further comprises a plurality of reservation tables including an integer reservation table (RT) 32A, an address reservation table 32B, and a floating point reservation table 32C, wherein each reservation table is configured to store the instruction to be executed by one of the execution units 30A-30D. Further, the processor 10 comprises a decoder 16 configured to decode regular instructions from the pre-decoder 14 to generate operation signals, and a dispatcher 18 configured to convey the operation signals into the reservation tables 32A-32C.

In addition, the two arithmetic-logic execution units (ALU) 30A, 30B are coupled to the integer reservation table 32A, the load/store execution unit (LSU) 32C is coupled to the address reservation table 32B, and the floating point execution unit (FPU) 30D is coupled to the floating point reservation table 32C. To avoid the execution units 30A-30D being turned off before it completed its operation stored in the reservation table 32A-32C, the power-off decoder 26 conveys the turn-off signal to the power manager 28 after one of the reservation tables 32A-32C corresponding to one of the execution units 30A-30D to be turned off is empty. For example, each of execution units 30A-30D includes a transistor, and the power manager 28 turns off the execution unit corresponding the identification via the transistor when receiving the turn-off signal.

Figure 2:
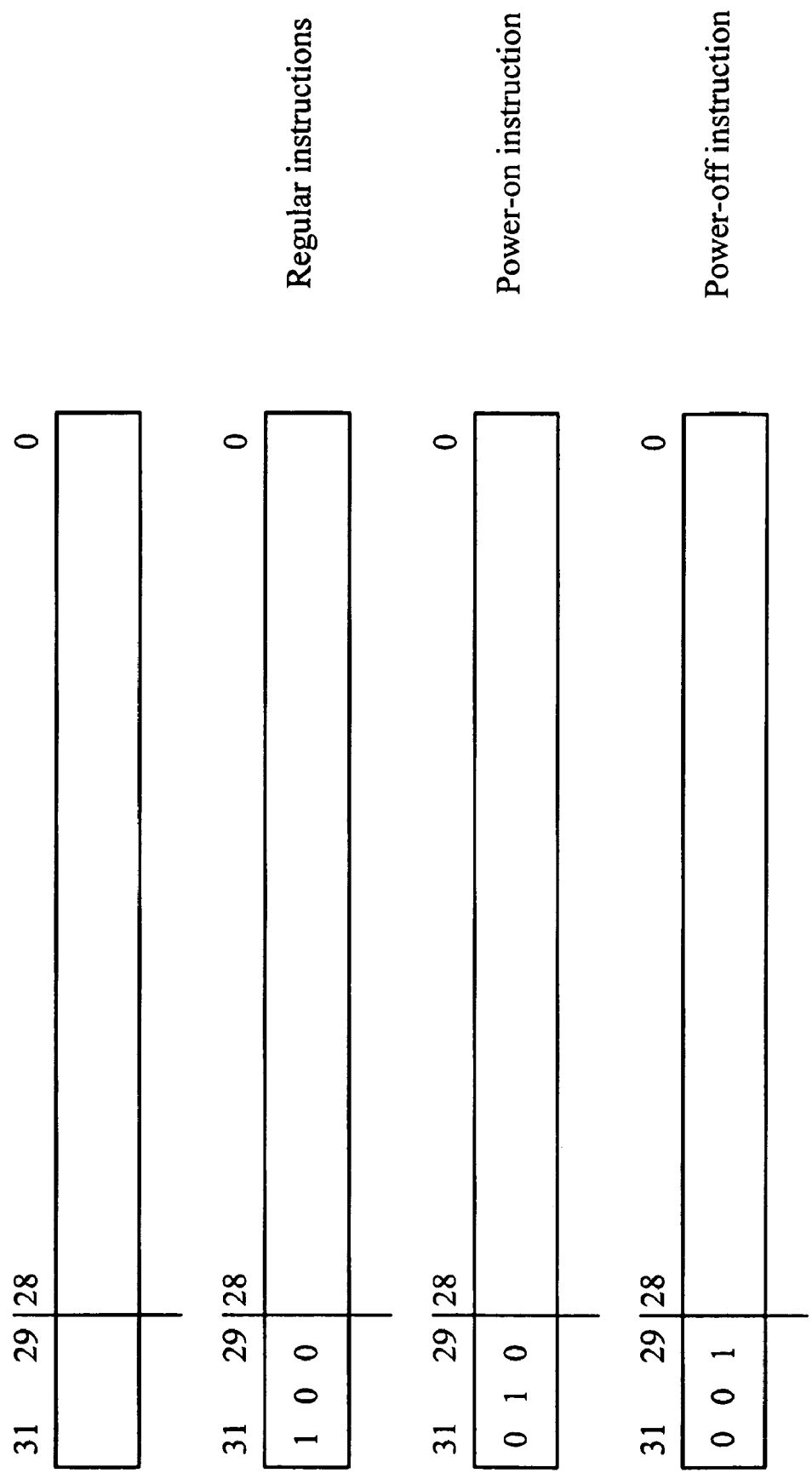
FIG. 2 is a schematic view illustrating instructions for a processor employing a power managing mechanism according to one embodiment of the present invention.

FIG. 2 illustrates instructions of 32 bits for the processor 10 employing a power managing mechanism according to one embodiment of the present invention. The front three bits are used to indicate the regular instruction, the power-on instruction, and the power-instruction, and the other 29 bits can be used to represent the identification of the execution unit, i.e., there are up to 229 identifications can be represented by the 29 bits. Once the pre-decoder 14 receives an instruction from the fetcher 12, the pre-decoder 14 can easily and quickly identify the type of the incoming instruction from the front three bits without delay, and then deliver the instruction identified as an regular instruction to the decoder 16, the one identified as a power-on instruction to the power-on decoder 24, or the one identified as a power-off instruction to the power-off decoder 26.

Figure 3:
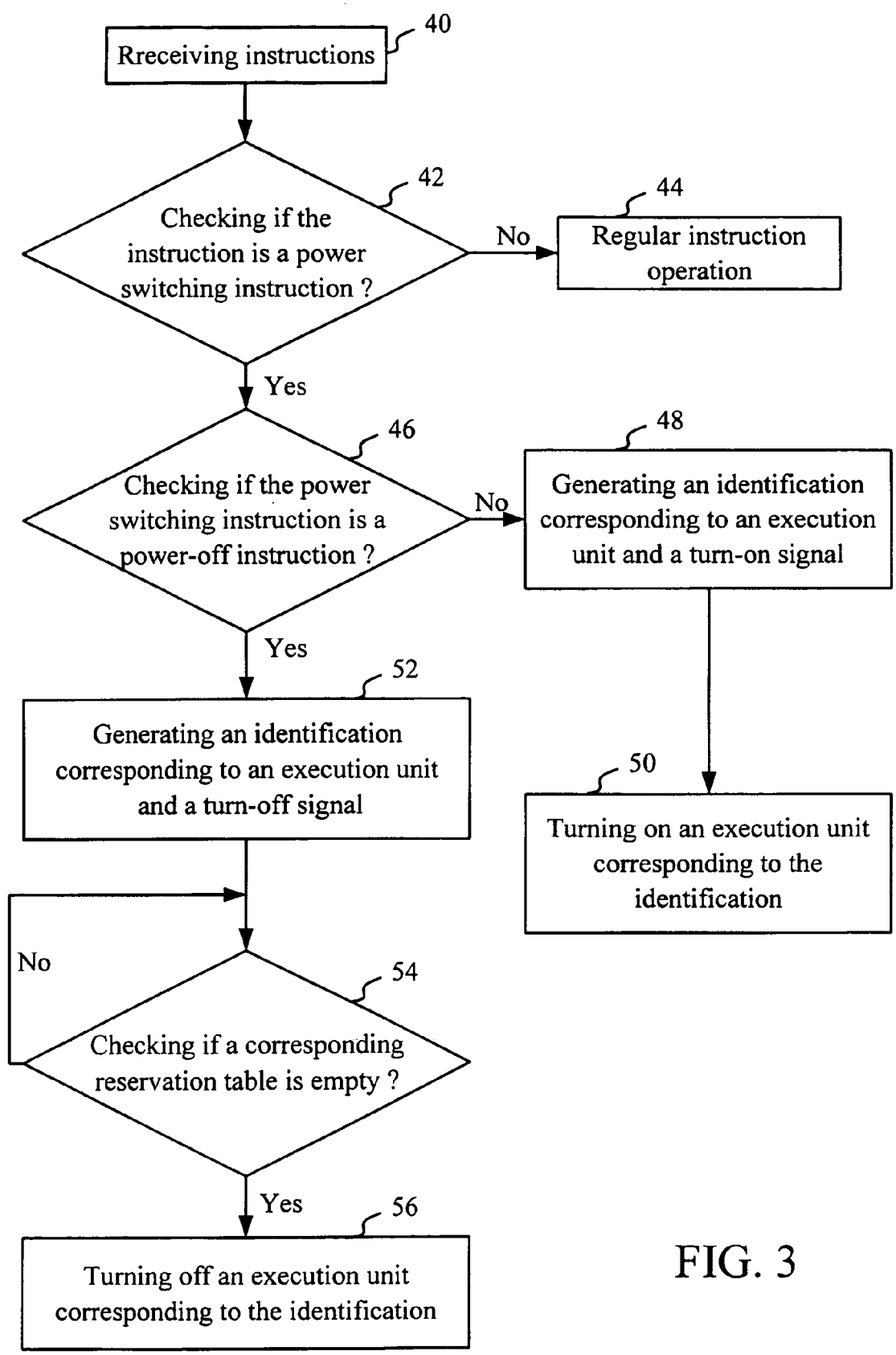
FIG. 3 illustrates a flow chart for a method of saving power for a processor employing a power managing mechanism according to one embodiment of the present invention.

FIG. 3 illustrates a flow chart for a method of saving power for the processor 10 according to one embodiment of the present invention. In step 40, instructions are received. In step 42, a check is conducted to verify if the instruction is a power-switching instruction. If the incoming instruction is not a power switching instruction, i.e., it is a regular instruction, the present method goes forward to the regular instruction operation as the prior skill does. If the incoming instruction is a power switching instruction, a check to verify if the power-switching instruction is a power-off instruction is conducted as indicated in step 46. If the power-switching instruction is not a power-off instruction, i.e., it is a power-on instruction, an identification corresponding to an execution unit and a turn-on signal from the power-on instruction are generated as indicated in step 48, and then an execution unit corresponding to the identification is turned on as indicated in step 50.

If the power-switching instruction is a power-off instruction at the step 46, an identification corresponding to an execution unit and a turn-off signal from the power-off instruction are generated as indicated in step 50. Subsequently, in step 54, a check is conducted to verify if a reservation table corresponding to an execution unit of the identification is empty. The operation of the step 54 is not terminated until the reservation table is empty. In step 56, once the reservation table is empty, the turn-off signal is then conveyed. Accordingly, an execution unit corresponding to the identification is turned off according to the turn-off signal. Obviously, one of the execution units can be optionally turned on to perform a desired operation and optionally turned off when it completes its operation in accordance with the present invention. Thus, power can be saved because power supply can be optionally suspended when no operation to be executed.

The above-described embodiments of the present invention are intended to be illustrative only. Numerous alternative embodiments may be devised by those skilled in the art without departing from the scope of the following claims.

We claim:

1. A processor employing a power managing mechanism comprising:
    a plurality of execution units configured to execute instructions;
    a precoder configured to sieve out a power-switching instruction from the executed instructions; and
    a power controller configured to control an on/off status of the execution unit based on the power-switching instruction, said power controller comprising:
        an identification decoder configured to generate an identification corresponding to one of the execution units from the power-switching instruction; and
        a power manager configured to switch on/off the execution unit corresponding to the identification, said identification decoder comprising:
            a power-on decoder configured to generate the identification and a turn-on signal based on a power-on instruction of the power-switching instruction; and
            a power-off decoder configured to generate the identification and a turn-off signal based on a power-off instruction of the power-switching instruction.

2. The processor employing a power managing mechanism of claim 1, further comprising:
    a plurality of reservation tables each configured to store the instruction to be executed by one of the execution units.

3. The processor employing a power managing mechanism of claim 2, wherein the power-off decoder configures the turn-off signal to the power manager when the reservation table corresponding to the execution unit to be turned off is empty.

4. The processor employing a power managing mechanism of claim 3, further comprising:
- a decoder configured to decode the instructions identified as regular instructions from the precoder to generate operation signals; and
- a dispatcher configured to convey the operation signals into the reservation table.

5. The processor employing a power managing mechanism of claim 2, wherein the reservation tables comprise an integer reservation table, an address reservation table and a floating point reservation table.

6. The processor employing a power managing mechanism of claim 5, wherein the execution unit comprises:
- at least one arithmetic-logic execution unit coupled to the integer reservation table;
- a load/store execution unit coupled to the address reservation table; and
- a floating point execution unit coupled to the floating point reservation table.

7. The processor employing a power managing mechanism of claim 1, wherein the execution unit includes a transistor, which turns off the execution unit when receiving a turn-off signal from the power manager.

8. A method of saving power for a processor employing a power managing mechanism, the method comprising steps of:
- receiving an instruction;
- checking if the instruction is a power-switching instruction;
- checking if the power-switching instruction is a power-off instruction;
- generating at least one identification and a control signal, wherein each identification corresponds to an execution unit;
- checking if a reservation table for the execution unit corresponding to the identification is empty on a condition that the power-switching instruction is a power-off instruction; and
- switching on/off status of the execution unit according to the control signal.

9. The method of saving power for a processor employing a power managing mechanism of claim 8, wherein the control signal includes a turn-off signal and a turn-on signal.

10. The method of saving power for a processor employing a power managing mechanism of claim 9, wherein the turn-off signal is generated when the reservation table for the execution unit corresponding to the identification is empty.

11. The method of saving power for a processor employing a power managing mechanism of claim 9, wherein the turn-off signal is executed when the reservation table for the execution unit corresponding to the identification is empty.

* * * * *